United States Patent
Kopton

(10) Patent No.: US 11,407,049 B2
(45) Date of Patent: Aug. 9, 2022

(54) TAPPING TOOL AND METHOD FOR PRODUCING A THREADED BORE

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 62 days.

(21) Appl. No.: 17/040,290

(22) PCT Filed: Apr. 2, 2019

(86) PCT No.: PCT/EP2019/058297
§ 371 (c)(1),
(2) Date: Sep. 22, 2020

(87) PCT Pub. No.: WO2019/206583
PCT Pub. Date: Oct. 31, 2019

(65) Prior Publication Data
US 2021/0016376 A1    Jan. 21, 2021

(30) Foreign Application Priority Data
Apr. 27, 2018    (DE) ...................... 10 2018 206 545.4

(51) Int. Cl.
*B23G 5/20*    (2006.01)
(52) U.S. Cl.
CPC .......... *B23G 5/20* (2013.01); *B23G 2200/141* (2013.01); *B23G 2200/142* (2013.01);
(Continued)
(58) Field of Classification Search
CPC ...... B23G 1/34; B23G 5/20; B23G 2200/141; B23G 2200/142; B23G 2200/143; B23G 2200/148; B23G 2200/18; Y10T 408/9048
See application file for complete search history.

(56) References Cited

U.S. PATENT DOCUMENTS 4,271,554 A * 6/1981 Grenell .................... B23G 5/20
470/204
4,651,374 A * 3/1987 Turchan ................ B23G 5/184
408/222
(Continued)

FOREIGN PATENT DOCUMENTS

CN    104174941 A    12/2014
DE    1 818 609 U     9/1960
(Continued)

OTHER PUBLICATIONS

Examination Report dated Feb. 6, 2019 in corresponding German application No. 10 2018 206 545.4; 10 pages including Machine-generated English-language translation.
(Continued)

*Primary Examiner* — Eric A. Gates
(74) *Attorney, Agent, or Firm* — Maier & Maier, PLLC

(57) ABSTRACT

A tapping tool for producing a threaded bore having an internal thread in a workpiece. The tapping tool has a main cutting edge on its drill tip and a thread profile trailing in a tapping direction. The method has a tapping stroke in which the tapping tool is driven into the workpiece at a tapping feed rate in the tapping direction and at a tapping speed synchronized therewith and the main cutting edge of the tool produces a core hole bore and the tool thread profile forms an internal thread on the inner wall of the core hole bore. Chips are produced in the tapping stroke, which are conveyed out of the threaded bore in a chip removal direction opposite to the tapping direction and collide with thread flanks of the internal thread facing toward the chips to be removed.

10 Claims, 15 Drawing Sheets

(52) U.S. Cl.
CPC .. *B23G 2200/143* (2013.01); *B23G 2200/148* (2013.01); *B23G 2200/18* (2013.01)

(56) References Cited

U.S. PATENT DOCUMENTS

| | | | | |
|---|---|---|---|---|
| 4,943,191 | A * | 7/1990 | Schmitt | B23G 5/184 |
| | | | | 408/1 R |
| 5,413,438 | A * | 5/1995 | Turchan | B23G 1/34 |
| | | | | 408/222 |
| 5,429,459 | A | 7/1995 | Palm | |
| 5,678,962 | A | 10/1997 | Hyatt et al. | |
| 6,012,882 | A * | 1/2000 | Turchan | B23G 5/188 |
| | | | | 408/222 |
| 6,499,920 | B2 * | 12/2002 | Sawabe | B23G 5/20 |
| | | | | 408/59 |
| 6,663,326 | B1 * | 12/2003 | Hiroyasu | B23B 27/18 |
| | | | | 407/29 |
| 6,811,320 | B1 | 11/2004 | Abbott | |
| 11,065,702 | B2 * | 7/2021 | Glimpel | B23G 5/20 |
| 11,110,530 | B2 * | 9/2021 | Glimpel | B23G 5/06 |
| 2007/0235228 | A1 | 10/2007 | Hata | |
| 2010/0221077 | A1 * | 9/2010 | Nash | B23G 5/06 |
| | | | | 408/1 R |
| 2018/0281089 | A1 * | 10/2018 | Yokokawa | B23G 5/18 |

FOREIGN PATENT DOCUMENTS

| | | |
|---|---|---|
| DE | 28 52 906 A | 6/1980 |
| DE | 38 80 394 T2 | 7/1993 |
| DE | 39 39 795 C2 | 9/1993 |
| DE | 10 2015 013 247 A1 | 4/2017 |
| DE | 10 2016 008 477 A1 | 1/2018 |
| DE | 10 2016 008 478 A1 | 1/2018 |
| JP | 6114631 A * | 4/1994 |
| JP | H06-179121 A | 6/1994 |
| JP | 2006082199 A * | 3/2006 |
| JP | 2012071405 A * | 4/2012 |
| JP | 10-2016-008478 A | 1/2016 |
| JP | 2019-524963 A | 9/2019 |
| WO | WO-2004022274 A1 * | 3/2004 ............. B23B 51/02 |

OTHER PUBLICATIONS

International Search Report dated Jun. 3, 2019 in corresponding International application No. PCT/EP2019/058297; 8 pages.
Written Opinion of the International Searching Authority dated Jun. 3, 2019 in corresponding International application No. PCT/EP2019/058297; 18 pages including Machine-generated English-language translation.
International Preliminary Report on Patentability dated Mar. 24, 2020 in corresponding International application No. PCT/EP2019/058297; 24 pages including Machine-generated English-language translation.
International Preliminary Report on Patentability dated Mar. 24, 2020, in connection with corresponding international application No. PCT/EP2019/058297 (6 pages).
Japanese Office Action dated Nov. 30, 2021, corresponding to Japanese Application No. 2020-560282; 27 pages (with English Translation).
Office Action dated May 27, 2022 in corresponding Korean Application No. 10-2020-703315; 10 pages including English-language translation.

* cited by examiner

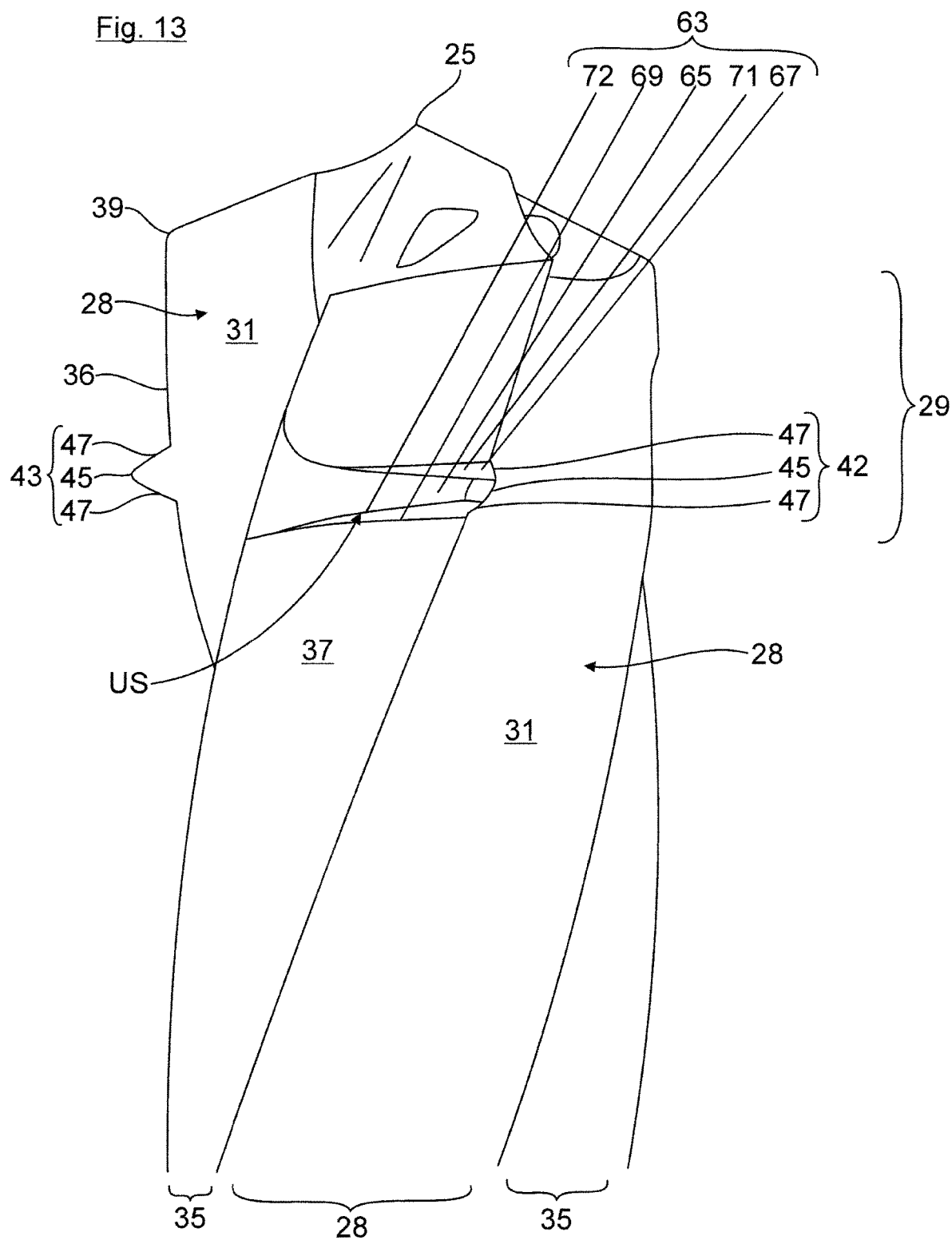

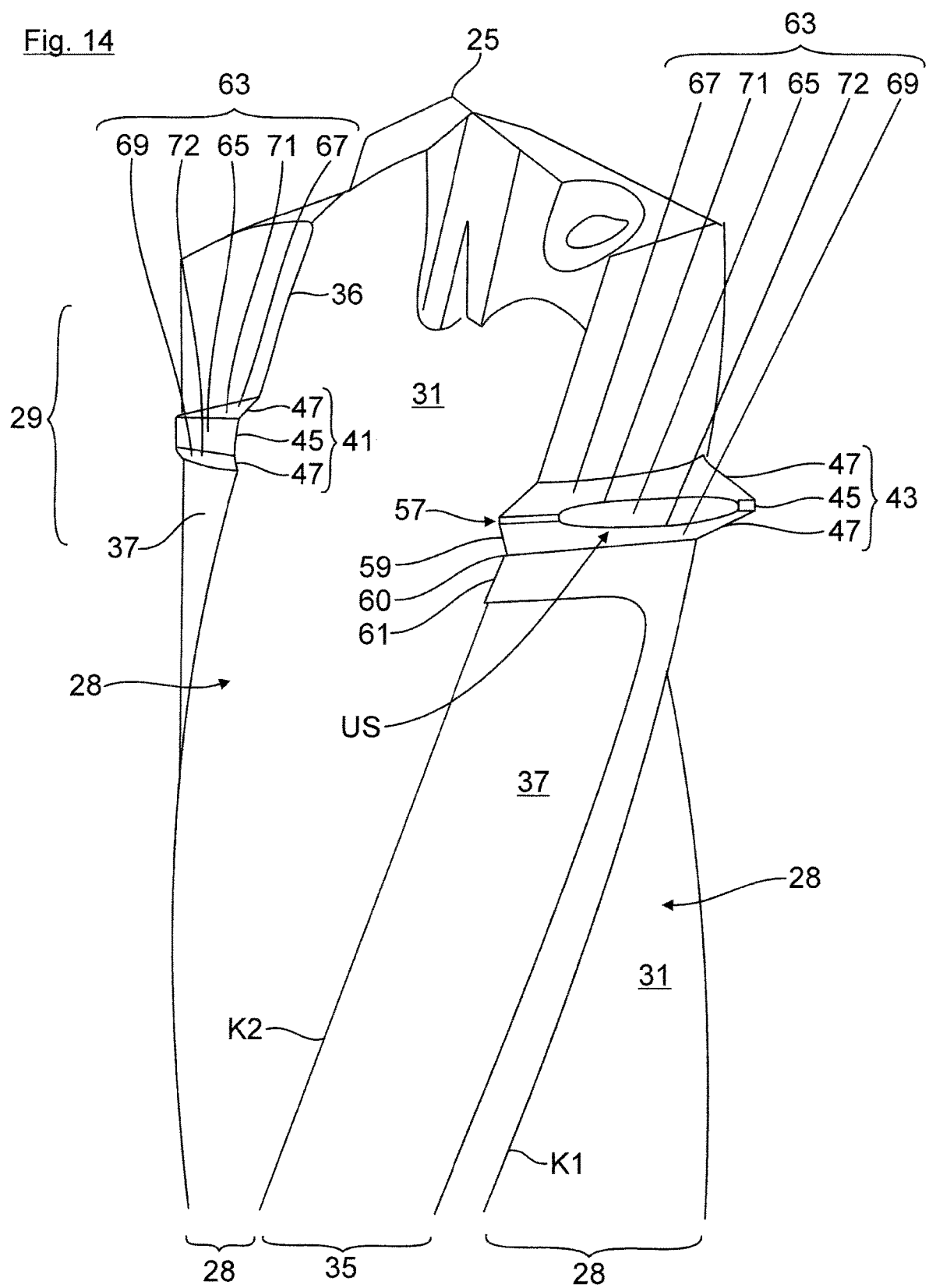

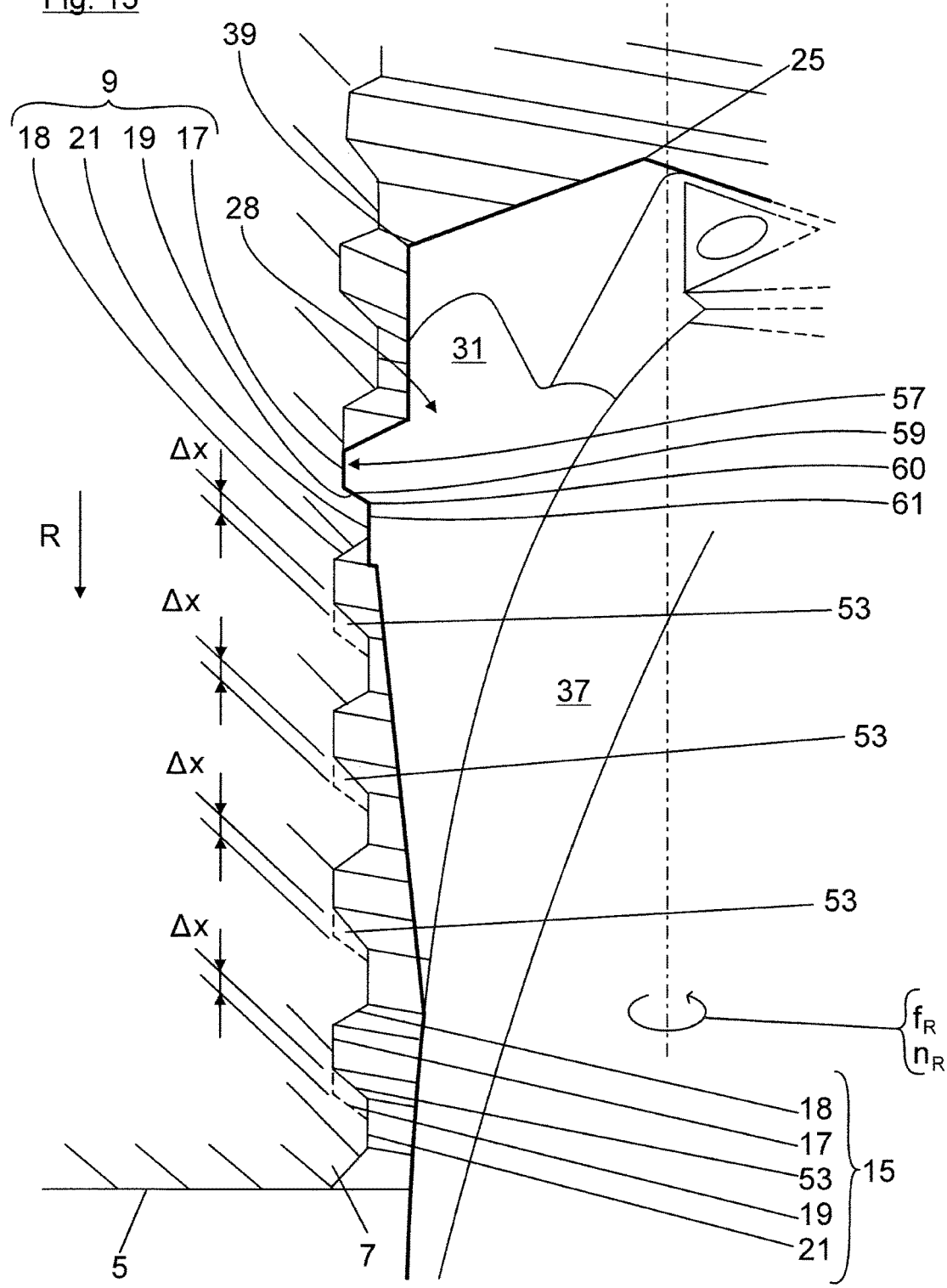

TAPPING TOOL AND METHOD FOR PRODUCING A THREADED BORE

FIELD

The invention relates to a tapping tool and a method for producing a threaded bore.

BACKGROUND

In a so-called one-shot tapping process, both a core bore and also an internal thread cut are carried out in one common tool stroke using a one-shot tapping tool. The one-shot tapping tool has a main cutting edge on its drill tip and a thread profile trailing in a tapping direction and having at least one thread cutting tooth. In the method, firstly the tapping stroke takes place and subsequently a reversing stroke opposite thereto. In the tapping stroke, on the one hand, the tool main cutting edge produces the core hole bore and, on the other hand, the tool thread profile produces the internal thread on the inner wall of the core hole bore until reaching a usable target thread depth. For this purpose, in the tapping stroke, the tapping tool is operated at a tapping feed rate using tapping speed synchronized thereto. In the subsequent opposing reversing stroke, the tapping tool is led out of the threaded bore in a reversing direction, specifically at opposing reversing feed rate and reversing speed synchronized thereto. It is thus ensured that the thread profile of the tapping tool is moved out of the threaded bore in the thread turn of the internal thread without load.

In the above method, chips are produced in the tapping stroke, which are conveyed out of the threaded bore in a chip removal direction opposite to the tapping direction. In this case, the chips moving in the chip removal direction collide with the thread flanks of the internal thread facing toward the chips. Therefore, material abrasion can occur on the thread flanks of the internal thread facing toward the chips, which results in flaws in the internal thread. Such flaws can in turn negatively affect the setting behavior of a screw element screwed into the internal thread.

A combined tool for drilling a hole and for tapping is known from DE 38 80 394 T2. Firstly a core hole bore is produced using the tapping tool. Subsequently, the tapping tool is moved with its tool axis in a circular path around the bore axis, specifically with rotation of the tapping tool, whereby the thread profile produces an internal thread in the core hole bore. Essentially the same method is also known from DE 39 39 795 T2 and from U.S. Pat. No. 5,678,962. Further tapping tools are known from U.S. Pat. No. 6,499, 920 B2 and from DE 28 52 906 A.

The object of the invention is to provide a tapping tool and a method for producing a threaded bore in a workpiece, using which a durable operationally-reliable screw connection is ensured.

SUMMARY

The invention is based on the fact that in the tapping stroke, the chips to be removed collide with chip-facing thread flanks of the internal thread and can possibly damage them. Against this background, according to the characterizing part of claim 1, in the tapping stroke, the chip-facing thread flanks of the internal thread are not yet produced to a finished dimension, but rather are produced having a flank allowance. In this way, a collision contour is provided on the chip-facing thread flanks, with which the chips to be removed collide.

The flank allowance is only removed from the chip-facing thread flanks of the internal thread down to the finished dimension in a finishing step following the tapping stroke. This finishing step takes place in the reversing stroke, during which the tool thread profile led out of the threaded bore in the reversing direction removes or forms the flank allowance from the thread flanks facing toward the chips down to the finished dimension. The material is removed from the thread flanks using at least one reversing tooth, which is formed in the thread profile of the tapping tool and the geometry of which is described later.

In the tapping stroke, the tapping feed rate and the tapping speed synchronized with it are matched with one another in such a way that the produced thread turn of the internal thread has a predefined tapping thread pitch. Similarly thereto, in the reversing stroke, the reversing feed rate and the reversing speed synchronized with it are matched to one another in such a way that a reversing thread pitch results. The reversing thread pitch can, depending on the setting of the above-mentioned parameters, be identical to the tapping thread pitch or, if necessary, can also be different from it. For example, a first pitch (i.e., tapping thread pitch) can be applied to the internal thread in the tapping stroke, while a different second thread pitch (i.e., reversing thread pitch) is applied to the internal thread in the reversing stroke. The reversing thread pitch and the tapping thread pitch can be matched to one another in such a way that the overall result is a load-optimized internal thread profile design.

For example, in the tapping stroke—with the exception of the thread flanks of the internal thread facing toward the chips—the internal thread geometry (i.e., the thread flanks of the internal thread facing away from the chips, the radially inner thread inner vertex of the internal thread, and the radially outer thread base of the internal thread) can already be produced at a finished dimension. Only then can the chip-facing thread flanks of the internal thread be produced at the finished dimension in the reversing stroke.

In one preferred embodiment, the tapping stroke is not immediately followed by the reversing stroke, but rather a groove forming step in which a circumferential groove adjoining the internal thread is formed without thread pitch, in which the thread profile of the tapping tool can rotate without load. In this way, the tapping speed can be reduced to 0 without the tool breaking or the thread profile breaking out due to excessive cutting edge load.

The thread profile of the tapping tool can have thread profile teeth described later and/or the above-mentioned reversing tooth. Both the thread profile teeth and the reversing tooth can each be designed as a forming tooth (having corresponding forming edges) or as a cutting tooth (having corresponding chip-removing cutting edges) or as a combination thereof.

As mentioned above, the thread profile of the tapping tool can rotate without load in the circumferential groove without a thread pitch produced in the groove forming step. The provision of the circumferential groove additionally makes it possible for the tapping tool to produce a circumferential thread countersink in the bore opening of the bore using a cutting edge. The circumferential thread countersink can therefore be produced during the above groove forming step.

In a technical implementation, the tapping stroke in the tapping direction can be immediately extended with a groove forming stroke. In this case, the tapping tool is moved beyond the target thread depth until a target bore depth is reached, namely at a groove forming feed rate and a groove forming speed, which are not synchronized with one another and/or are different from the tapping feed rate and the tapping speed.

It is preferred if, at the end of the groove forming step, the thread profile, viewed in the axial direction, can rotate completely in the circumferential groove of the threaded bore without load. The circumferential groove is produced during the groove forming stroke with the aid of the main cutting edge and the tool thread profile on the tapping tool.

When the target bore depth is reached, the groove forming feed rate is reduced to 0. At the same time, the groove forming speed is also reduced to 0 in order to enable the reversal of the direction of rotation required for the reversing stroke.

At the start of the reversing stroke, the tapping tool is controlled in such a way that the tool thread profile cannot be moved into the thread turn runout, which opens into the circumferential groove, without load, but rather under chip-removing load. The tapping tool is then led out of the threaded bore in a reversing direction opposite to the tapping direction, specifically at a reversing feed rate and a reversing speed synchronized therewith, whereby the tool thread profile can be rotated out of the threaded bore with material removal and/or material forming (i.e., with finishing of the thread flanks facing toward the chips to the finished dimension).

During the execution of the tapping stroke, the groove forming stroke, and the reversing stroke, the core bore longitudinal axis and the axis of rotation of the tapping tool preferably remain coaxially aligned to one another continuously.

A tapping tool for carrying out such a method can preferably have a clamping shaft and an adjoining tapping body. At least one flute can extend along its longitudinal axis up to a frontal main cutting edge on the drill tip. A rake face delimiting the flute and a frontal free surface of the drill tip converge on the frontal main cutting edge. Viewed in the tool circumferential direction, the flute can be delimited by at least one drill web. The rake face of the flute can merge into an outer circumferential drill web rear face with the formation of a secondary cutting edge. The thread profile can be formed having at least one thread cutting tooth on the outer circumferential drill web rear face. The tooth height of the cutting tooth is dimensioned in the radial direction in such a way that the cutting tooth protrudes outward beyond the main cutting edge in the radial direction by a radial offset. If necessary, the cutting tooth can extend the main cutting edge outwards in the radial direction surface flush. Alternatively and/or additionally, the cutting tooth can be arranged behind the main cutting edge by an axial offset viewed in the axial direction.

In one preferred embodiment variant, the tapping tool can have three drill webs. Each of these drill webs is formed having at least one thread cutting tooth. The thread cutting teeth are preferably not designed having the same cutting edge geometry, but rather are embodied differently. For example, a preliminary cutting tooth, a middle cutting tooth and a finishing tooth of different cutting geometry can be formed on the drill in succession in the drill circumferential direction. The cutting teeth are formed on the tapping tool offset from one another in the axial direction. Their offset dimensions are matched with the tapping speed and the tapping feed rate so that perfect thread cutting is ensured.

The tool thread profile has the above-mentioned reversing tooth so that in the reversing stroke, the flank allowance is removed from the chip-facing thread flank in an operationally reliable manner (i.e., without premature tool breakage).

It can be formed having a thread flank cutting/forming edge. In the reversing stroke, the thread flank cutting/forming edge can remove the flank allowance preserved in the tapping stroke from the chip-facing thread flanks to the finished dimension.

The reversing tooth, like the thread profile tooth, is formed on the drill web rear face. In a technical tool implementation, the reversing tooth can project radially outward beyond the main cutting edge by a reversing tooth height. The thread flank cutting edge of the reversing tooth can merge into a reversing cutting edge at a radially inner cutting edge inside corner. In this case, the tapping tool can not only machine the chip-facing thread flank of the bore internal thread, but rather can also deburr its inner thread vertex at the same time. The reversing tooth and/or the reversing cutting edge can preferably be designed structurally in such a way that they are only active in the reversing stroke and are largely inoperative in the tapping stroke.

The above-mentioned reversing cutting edge can extend along the drill longitudinal direction. In this case, the outer circumferential drill web rear face and the rake surface of the flute can converge at the reversing cutting edge. Therefore, the reversing cutting edge and the secondary cutting edge are formed on drill web longitudinal edges that are opposite in the drill circumferential direction.

In order to form a stable thread profile on the tapping tool, it is preferable if, in the drill circumferential direction, a tooth web formed on the drill web rear face adjoins the at least one thread profile tooth and/or the reversing tooth. In this way, the thread profile tooth and/or the reversing tooth are protected from premature tool breakage in the tapping stroke and/or in the reversing stroke. The thread profile tooth and the reversing tooth can preferably be connected to one another via a tooth web formed on the drill web rear face. The tooth web can have end faces facing away from one another in the drill circumferential direction, which respectively form the thread profile tooth and the reversing tooth.

The tooth web can have a radially outer web vertex surface and a web flank surface facing toward the drill tip and a web flank surface facing away from the drill tip. To reduce the tool load during the tapping stroke and/or during the reversing stroke, the above-mentioned web surfaces can be formed at least partially as free surfaces, which are essentially inoperative in the tapping stroke and/or in the reversing stroke.

The web vertex surface of the above tooth web can merge at a first circumferential web edge into the web flank surface facing toward the drill tip. Moreover, the web vertex surface can merge at a second circumferential web edge into the web flank surface facing away from the drill tip.

Alternatively and/or additionally to the above aspects of the invention, the thread profile of the tapping tool can have a circumferential groove cutting edge according to independent claim 9. The circumferential groove cutting edge is active in the groove forming step, which takes place between the tapping stroke and the reversing stroke. The circumferential groove cutting edge causes a reduced tool load during the production of the circumferential groove in the groove forming stroke.

In a preferred embodiment variant, at least one of the two above-mentioned circumferential web edges can be designed as such a circumferential groove cutting edge by means of which the circumferential groove adjoining the hole internal thread is formed in the groove forming stroke In the tapping stroke and in the reversing stroke, in contrast, the circumferential cutting edge can be essentially inoperative.

As can be seen from the above description, the circumferential groove can adjoin the internal thread of the threaded bore. This fulfills the following double function: First, the thread profile of the tapping tool can rotate in the circumferential groove without load during the thread production. Second, when a fastening screw is screwed, the circumferential groove forms a compensation space that compensates for screw length tolerances of the fastening screw. The screw length of such a fastening screw is subject to strong tolerances due to the production. With the aid of the circumferential groove, the tolerance-affected fastening screw can be screwed in a process-reliable manner without the thread depth of the threaded bore having to be increased, as would be required in the prior art.

BRIEF DESCRIPTION OF THE FIGURES

The invention and its advantageous designs and refinements and the advantages thereof are explained in greater detail hereinafter on the basis of drawings.

In the figures:

FIG. 13 shows views of a tapping tool according to a further exemplary embodiment;

FIG. 14 shows views of a tapping tool according to a further exemplary embodiment; and FIG. 15 shows a view corresponding to FIG. 10.

Figure 1:
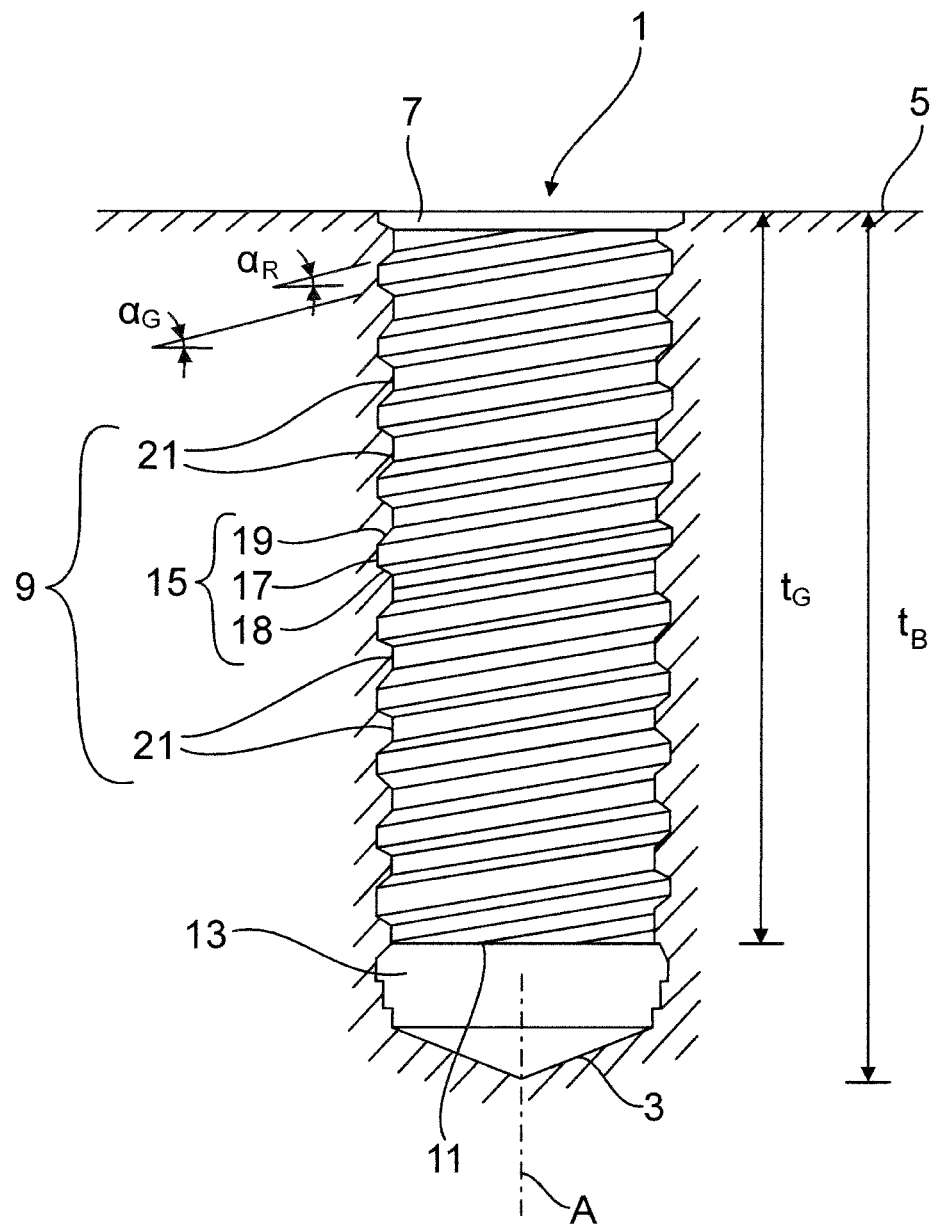
FIG. 1 shows a threaded blind hole formed in a workpiece in a side sectional view.

A finished threaded blind hole bore 1 is shown in FIG. 1. The hole 1 is machined with its bore base 3 to a target drilling depth $t_B$ in a workpiece 5 by means of so-called one-shot drilling, which will be explained later with reference to FIGS. 5 to 8. The bore 1 has a circumferential thread countersink 7 at its bore opening, which merges into an internal thread 9 in the further downward course. The internal thread 9 extends along the bore axis A to a usable target thread depth $t_G$. As can also be seen from FIG. 1, a thread turn 15 of the internal thread 9 opens with a thread runout 11 into a circumferential groove 13. This groove does not have a thread pitch and is formed between the internal thread 9 and the bore base 3, viewed in the axial direction. The thread 15 has a radially outer thread base 17 as well as lateral upper and lower thread flanks 18, 19, which merge radially on the inside into an inner thread vertex 21. The upper thread flanks 19 in FIG. 1 are the chip-facing thread flanks described later with reference to FIGS. 9 and 10, while the lower thread flanks 18 in FIG. 1 are the chip-averted thread flanks.

Figure 2:
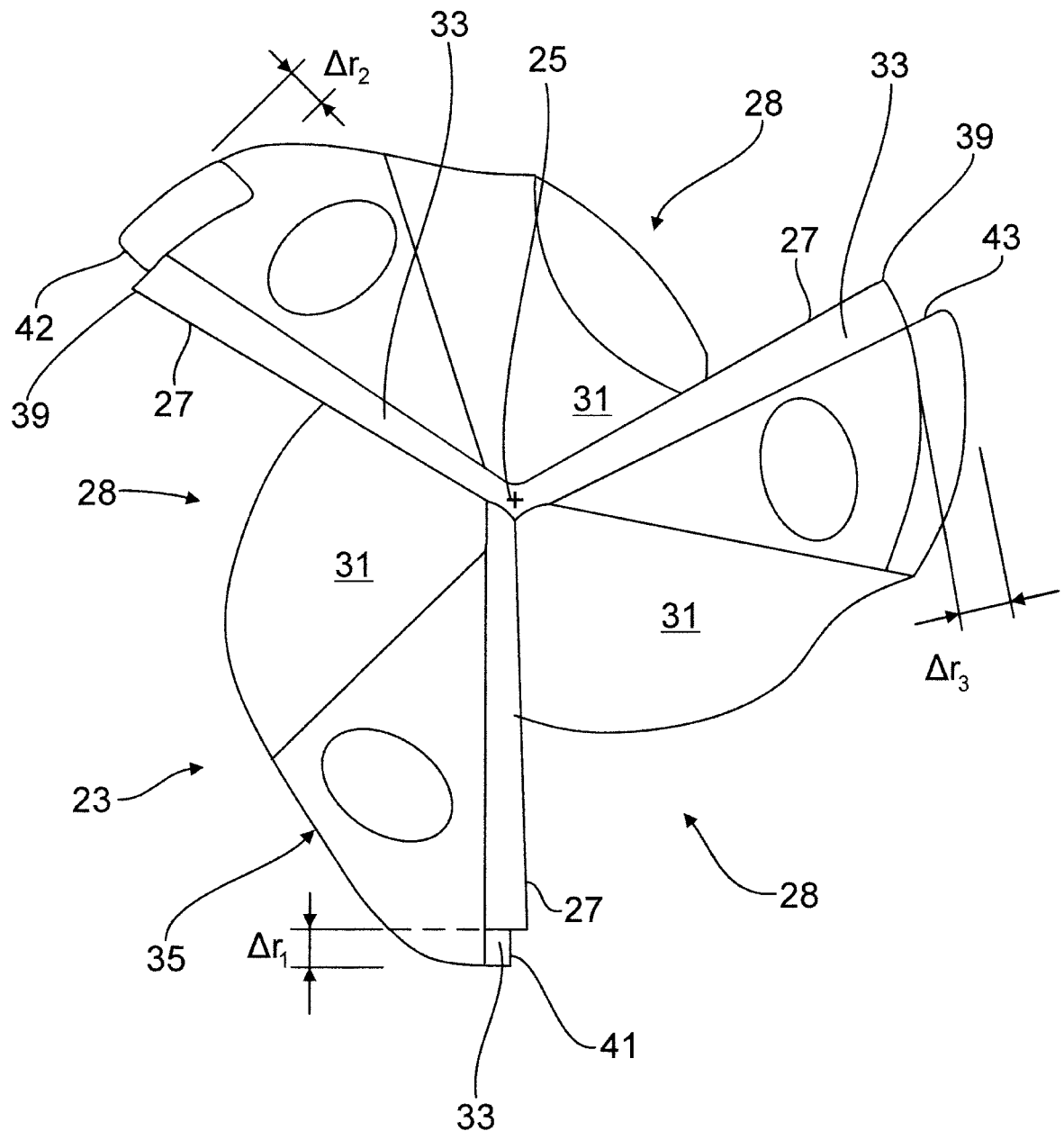
FIG. 2 shows a view from the front of a tapping tool.
Figure 3:
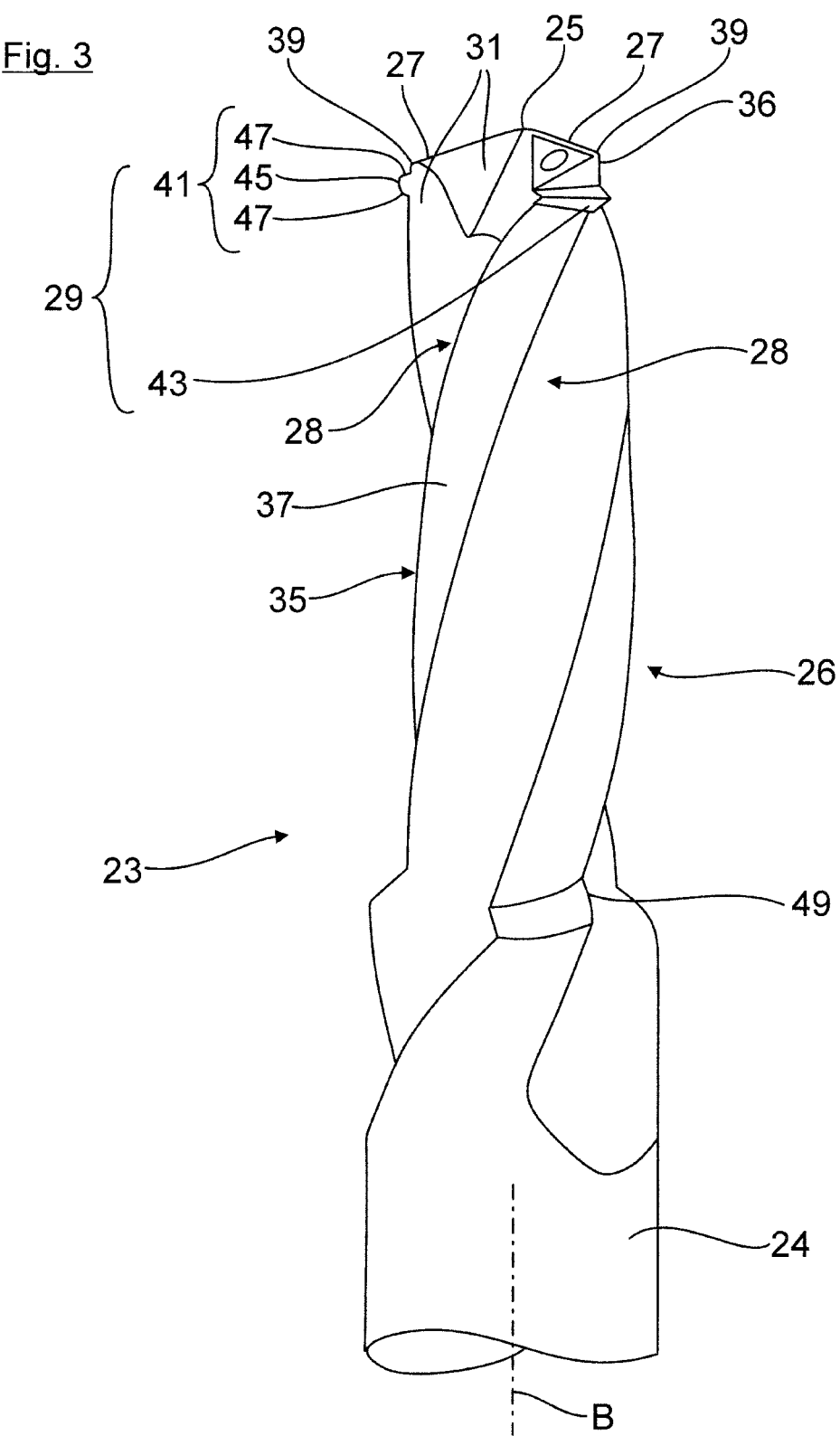
FIG. 3 a side view of the tapping tool.
Figure 4:
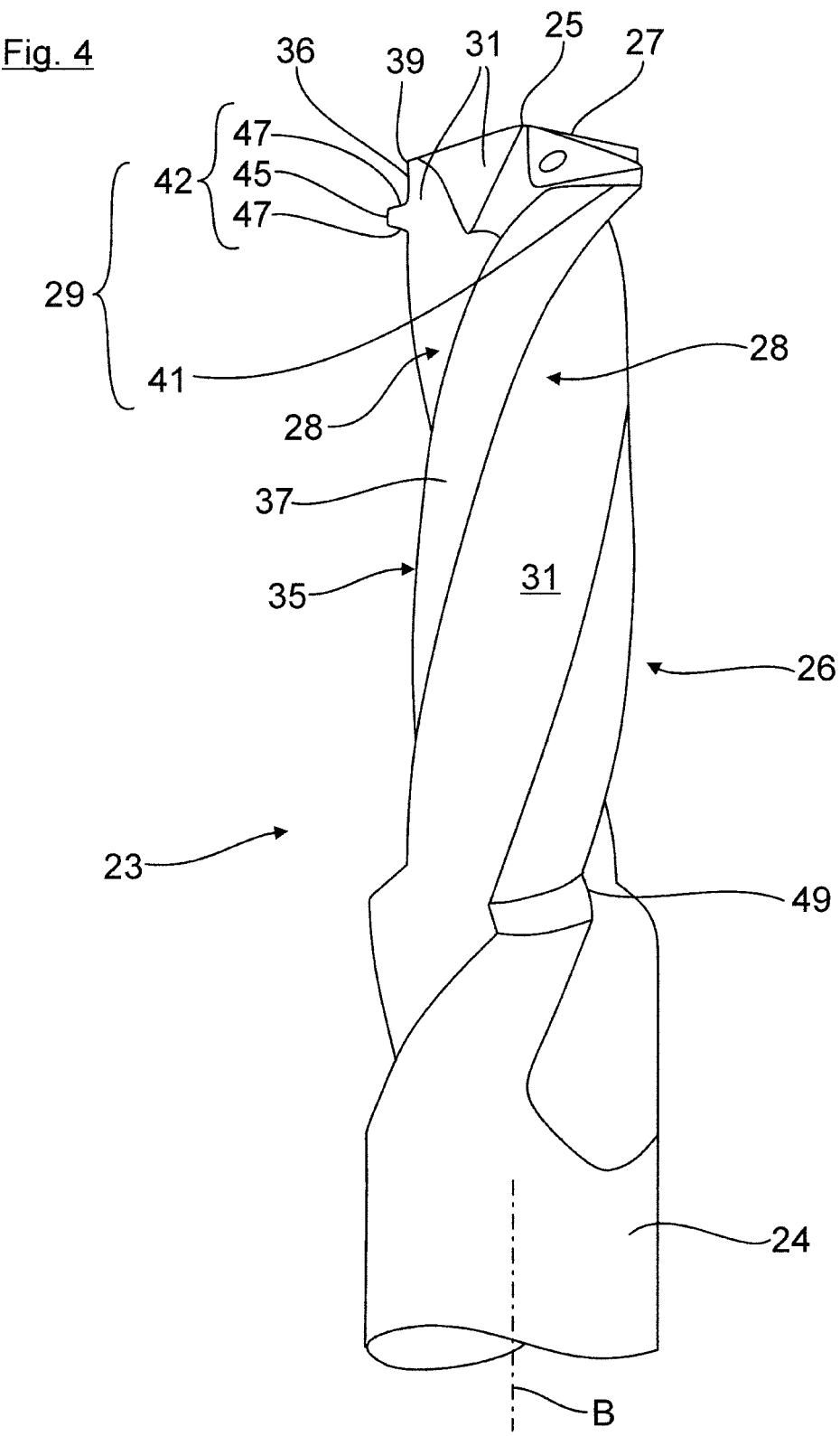
FIG. 4 another side view of the tapping tool
Figure 5:
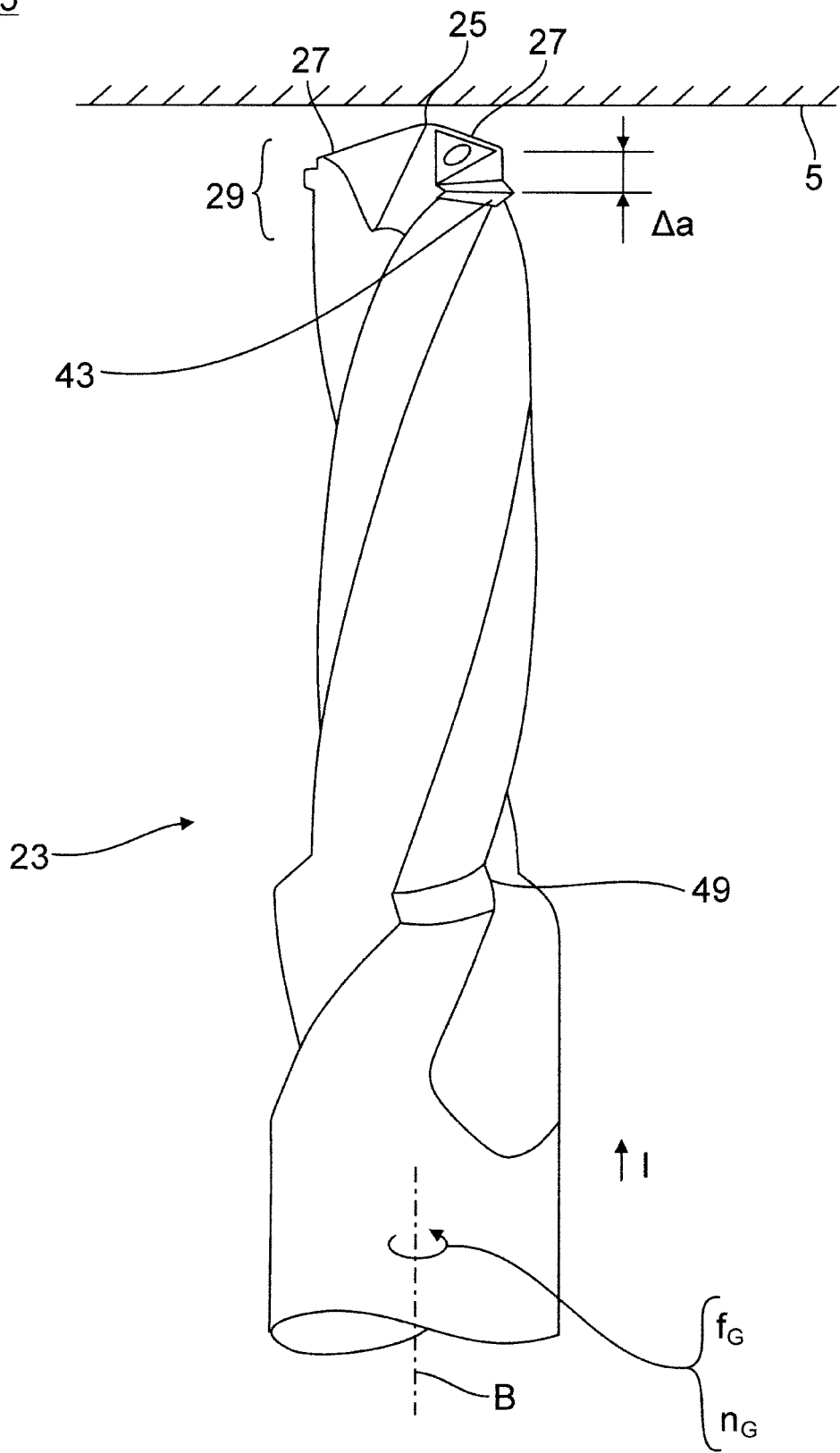
FIG. 5 views which illustrate method steps for producing the threaded blind hole shown in FIG. 1.
Figure 6:
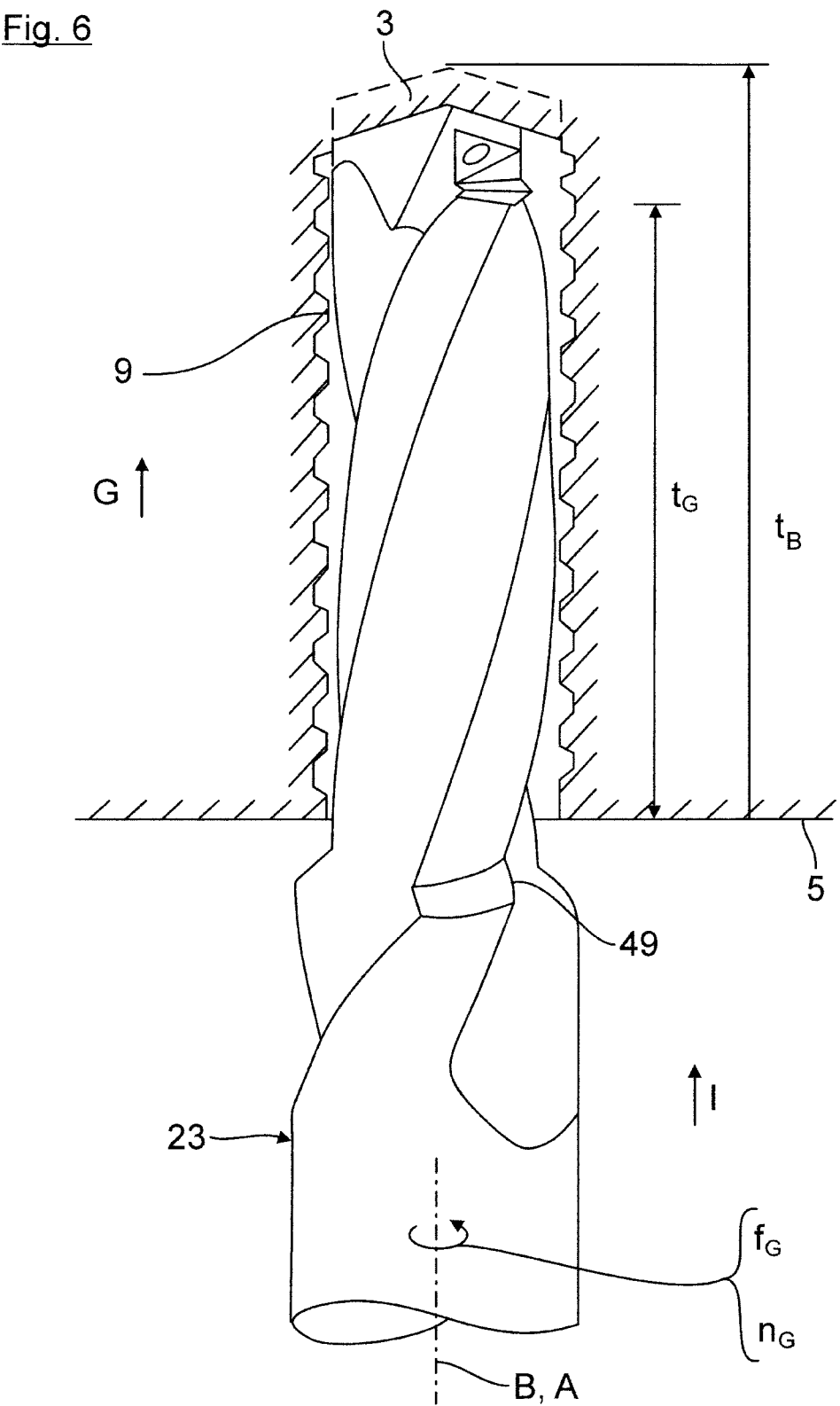
FIG. 6 additional views which illustrate method steps for producing the threaded blind hole shown in FIG. 1.

The threaded blind hole bore 1 shown in FIG. 1 is carried out with the aid of a tapping tool 23 described hereinafter on the basis of FIGS. 2 to 4. Accordingly, the tool 23 in FIG. 2 has, on its drill tip 25, three uniformly circumferentially distributed, frontal main cutting edges 27 and a thread profile 29 trailing in the tapping direction I (FIG. 5 or 6).

The tool 23 is constructed having a clamping shaft 24 and an adjoining tapping body 26, along the bore axis A of which a total of three circumferentially distributed flutes 28 extend up to the respective frontal main cutting edge 27 on the drill tip 25.

At each main cutting edge 27, a rake face 31 delimiting the flute 28 and a frontal free face 33 of the drill bit 25 converge. In the circumferential direction of the tool, the respective flute 28 is delimited by a drill web 35. Overall, the tapping tool 23 shown in the figures has three drill webs 35. The rake face 31 of the flute 28 merges with the formation of a secondary cutting edge 36 into an outer circumferential rear face 37 of the respective drill web 35. The secondary cutting edge 36 and the frontal main cutting edge 27 converge at a radially outer main cutting edge 39.

On the outer circumferential rear faces 37 of the three drill webs 35, the thread profile 29 has respectively a preliminary cutting tooth 41, a middle cutting tooth 42, and a finishing cutting tooth 43. Each of the cutting teeth 41, 42, 43 is formed having a radially outer thread base cutting edge 45 and thread flank cutting edges 47 in order to cut/form the thread turn 15 shown in FIG. 1. The cutting teeth 41 to 43 are embodied in different geometries and are spaced apart from the drill tip 25 at different axial distances Aa (only indicated in FIG. 5) in order to cut the thread turn 15 of the internal thread 9 shown in FIG. 1. In addition, the preliminary, middle, and finishing cutting teeth 41, 42, 43 can have different tooth heights Ari, Are, Ara (FIG. 2) in the radial direction. As an example, the preliminary, middle, and finishing cutting teeth 41, 42, 43 can become axially larger in the circumferential direction. The finishing cutting tooth 43 then cuts the entire internal thread contour. Alternatively to this, the finishing cutting tooth 43 can also be embodied as a forming tooth in order to increase the thread strength.

The tapping tool 23 also has a cutting edge 49 at the transition between the tapping body 26 and the clamping shaft 24 for forming the thread countersink 7 shown in FIG. 1

The method for producing the threaded blind hole bore 1 shown in FIG. 1 is described hereinafter with reference to FIGS. 5 to 8: Accordingly, in FIG. 5, the tapping tool 23 is guided in a tapping direction I to the not yet predrilled tool 5 and a one-shot bore is carried out. In a tapping stroke G, the main cutting edges 27 produce a core hole bore and the trailing thread profile 29 produces the internal thread 9 on the inner wall of the core hole bore. The tapping stroke G takes place at a tapping feed rate $f_G$ and at a tapping speed $n_G$ synchronized therewith in a tapping rotational direction, namely until the target thread depth $t_G$ is reached (FIG. 6).

Immediately thereafter, a groove forming step (FIG. 7) is carried out in which the tapping stroke G in the tapping direction I is extended by a groove forming stroke N. In contrast to the thread-forming stroke G, in the groove-forming stroke H, the groove-forming feed rate $f_N$ and the groove-forming speed $n_N$ of the tapping tool 23 are not synchronized with one another, and are different from the previous tapping feed rate $f_G$ and the tapping speed $n_G$.

Figure 7:
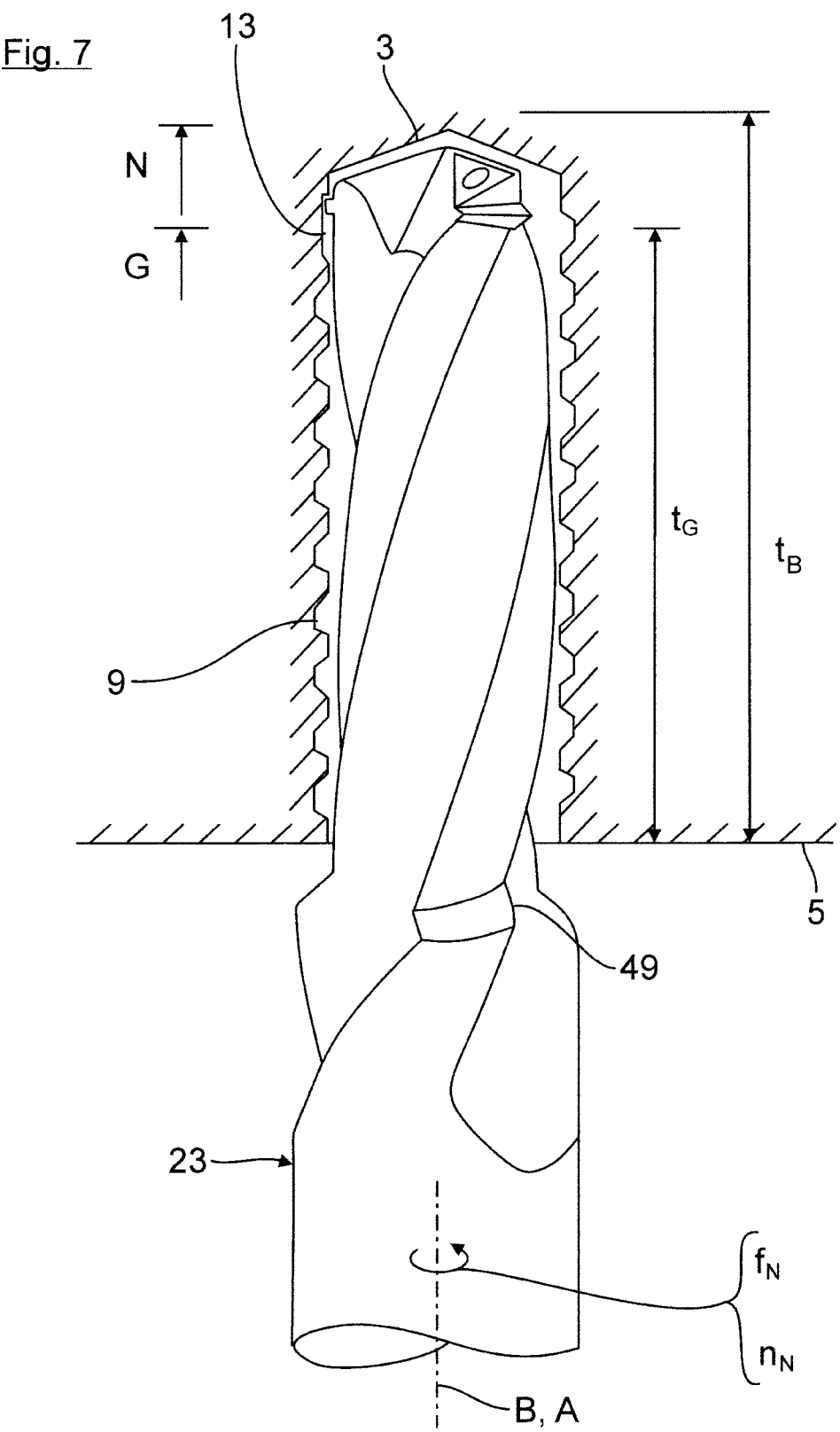
FIG. 7 additional views which illustrate method steps for producing the threaded blind hole shown in FIG. 1.

In this way, the thread profile 29 produces, using its preliminary, middle, and finishing cutting teeth 41, 42, 43, the circumferential groove 13 shown in FIG. 7, in which the thread profile 29 can rotate without load. The groove forming feed rate $f_N$ and the groove forming speed $n_N$ are designed in such a way that excessive cutting edge load of the cutting teeth 41 to 43 is prevented.

Figure 8:
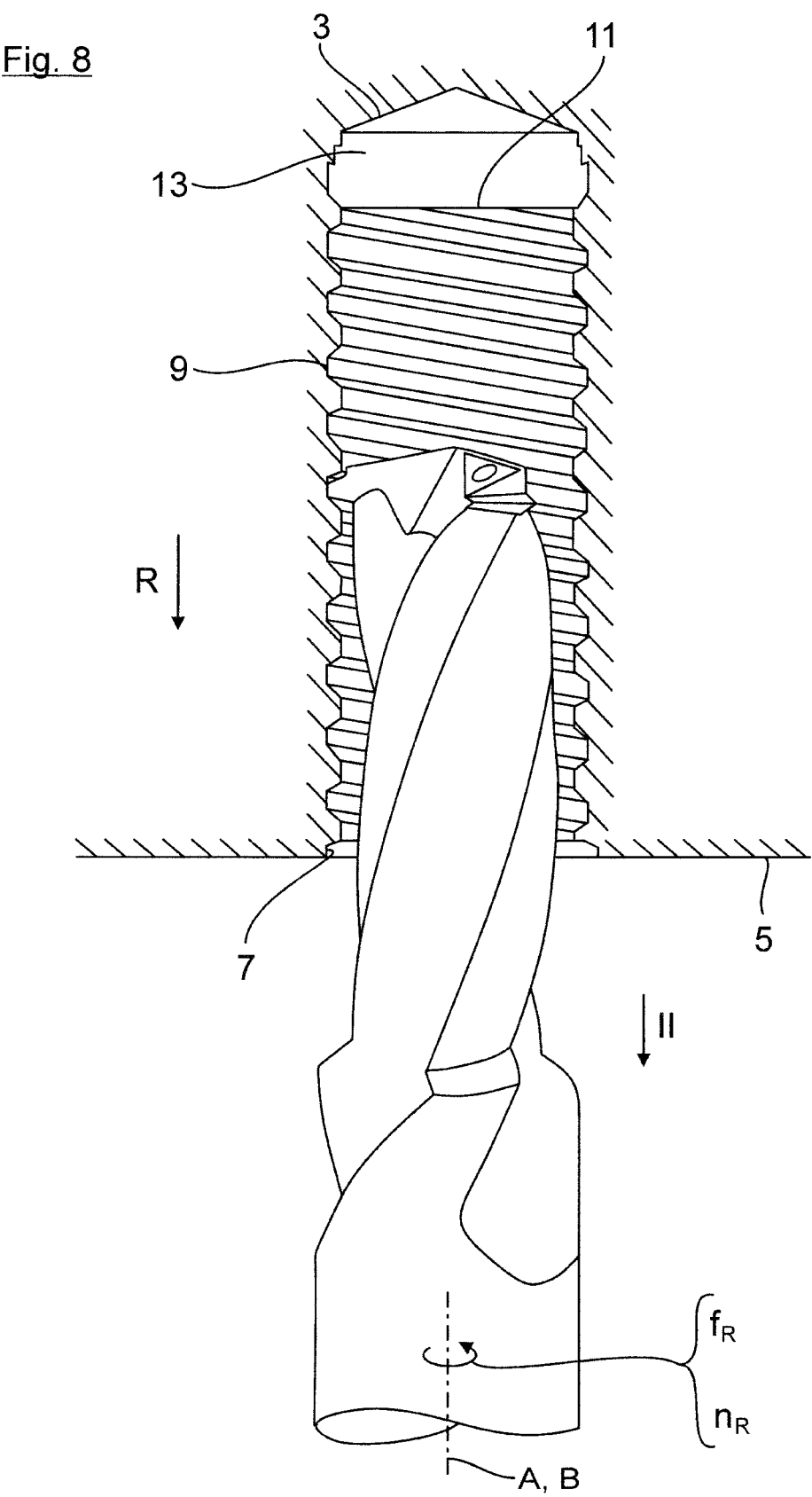
FIG. 8 additional views which illustrate method steps for producing the threaded blind hole shown in FIG. 1.

When the target bore depth $t_B$ is reached, both the groove forming feed rate $f_N$ and the groove forming speed $n_N$ are reduced to 0. A rotational direction is then reversed in preparation for a reversing stroke R (FIG. 8). In the reversing stroke R (FIG. 8), the tapping tool 23 is led out of the threaded bore 1 in a reversing direction II (FIG. 8), specifically at an opposite reversing feed rate $f_R$ and a reversing speed $n_R$ synchronized with it. These parameters are dimensioned in such a way that the thread profile 29 of the tapping tool 23 is not led out of the threaded bore 1 without load, but under a chip-removing load in the thread turn 15 of the internal thread 9. In this way, as will be described later, a collision contour 53 (FIG. 9 or 10) that is still formed on the thread flanks 19 of the internal thread 9 is removed.

At the start of the reversing stroke R, the tapping tool 23 is controlled by the production system in such a way that the cutting teeth 41, 42, 43 are each moved into the thread runout 11, which opens into the circumferential groove 13, under chip-removing load. In the further course of the reversing stroke R, the thread profile 29 of the tapping tool 23 is then rotated outwards through the thread turn 15 of the internal thread 9 under chip-removing load (that is, the collision contour 53 is removed).

Figure 9:
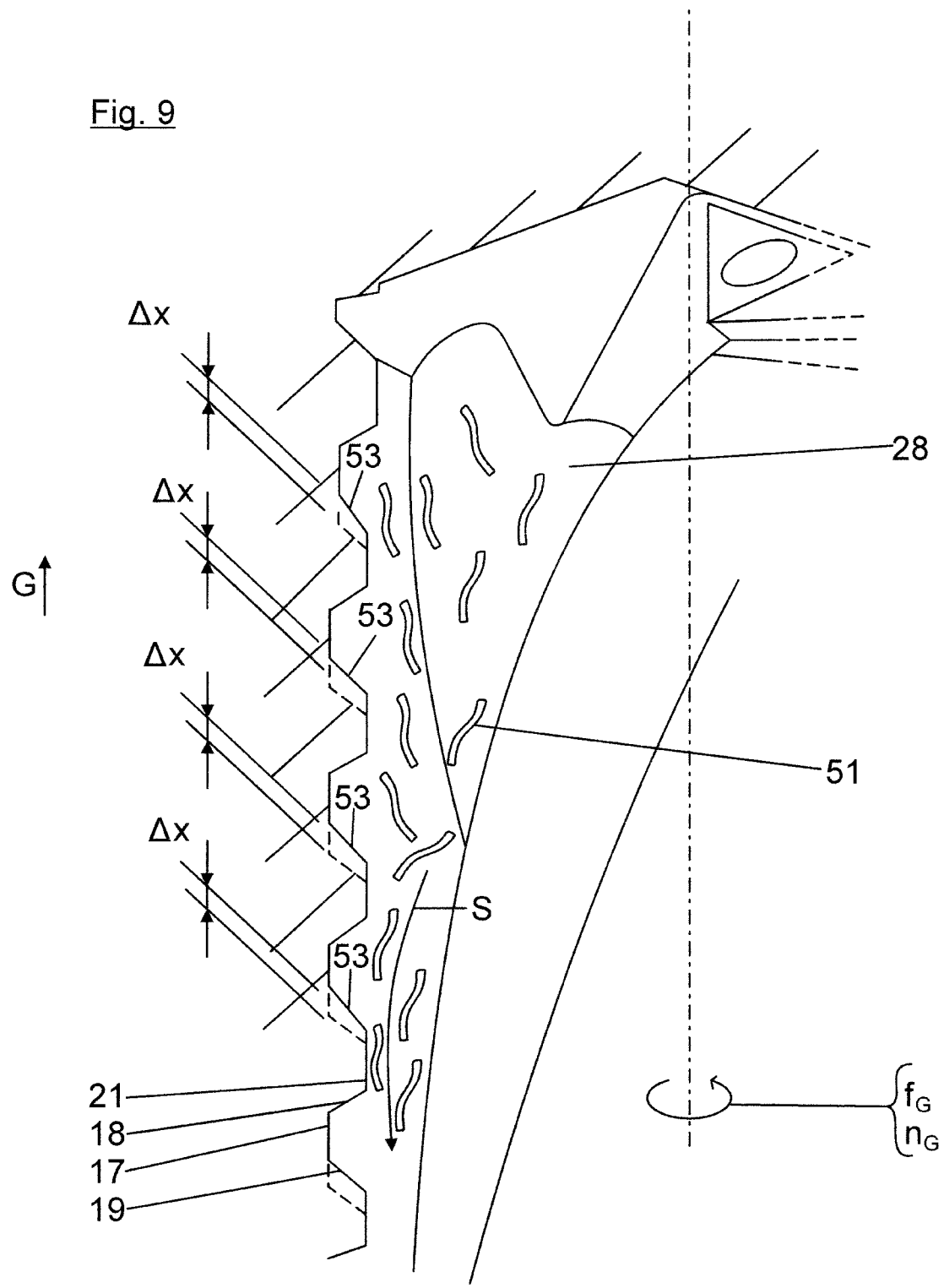
FIG. 9 shows an enlarged partial view in which a chip removal during the tapping stroke is illustrated.
Figure 10:
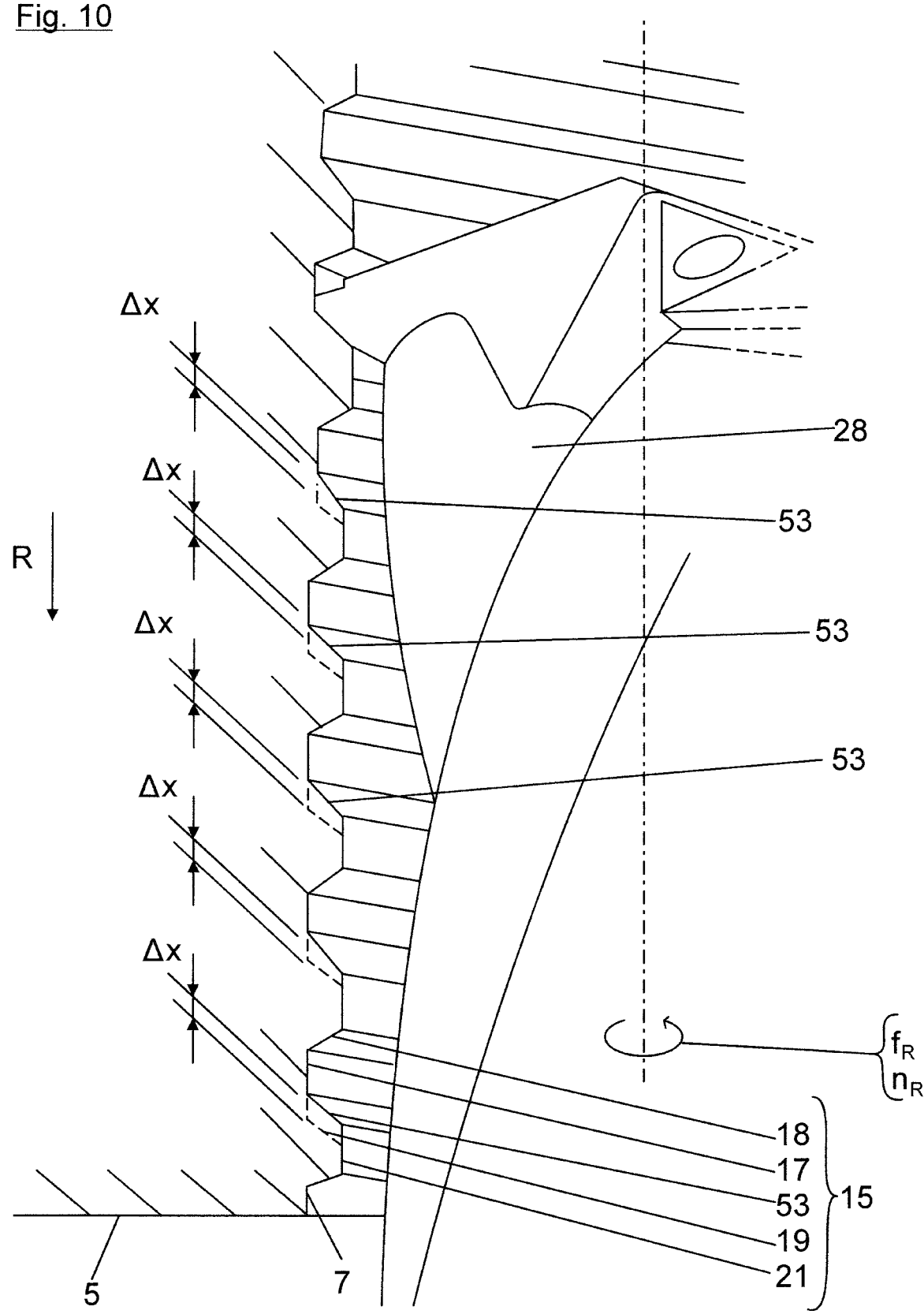
FIG. 10 shows an enlarged partial view in which a material removal during the reversing stroke is illustrated.

The tapping stroke G illustrated in FIG. 6 is shown in detail in FIG. 9. Accordingly, the tapping tool 23 is driven into the workpiece 5 in the tapping direction I at the predefined tapping feed rate $f_G$ and at the tapping speed $n_G$ synchronized therewith. In the process, chips 51 are produced, which are pressed out of the threaded bore 1 in a chip removal direction S opposite to the tapping direction I. The chips 51 conveyed in the chip removal direction S out of the threaded bore 1 collide with the chip-facing thread flanks 19 of the internal thread 5.

According to the invention, in the tapping stroke I—with the exception of the chip-facing thread flanks 19 of the internal thread 9—the complete internal thread geometry is already produced at the finished dimension, specifically in detail the chip-averted thread flanks 18, the radially inner thread inner vertex 21, and the radially outer thread base 17. In contrast to this, after the tapping stroke I, the chip-facing thread flanks 19 of the internal thread 9 are not yet produced to a finished dimension, but rather are produced having an additional flank allowance $\Delta x$ (FIG. 9). In this way, a collision contour 53 is provided on the chip-facing thread flanks 19, with which the chips 51 to be removed collide.

The above collision contour 53 on the chip-facing thread flanks 19 is removed in the subsequent reversing stroke R down to the finished dimension. For this purpose, the tapping tool is positioned in the axial direction in the groove forming step in such a way that at the start of the reversing stroke R, the tapping tool 23 is controlled in such a way that the thread profile 29 is introduced the thread turn runout 11, which opens into the circumferential groove, under chip-removing load, i.e. with material removal (FIG. 1).

By accordingly setting the reversing feed rate $f_R$ and the reversing speed $r_R$ synchronized with it, a reversing thread pitch $\alpha_R$ for the chip-facing thread flanks 19 in the internal thread 9 results in the reversing stroke R. The reversing thread pitch $\alpha_R$ of the chip-facing thread flank 19 can be identical to the tapping thread pitch $\alpha_G$ or different therefrom in order to achieve a load-optimized internal thread design, if necessary.

In this way, different flank diameters can be set for different alloys of the workpiece 5, wherein the respective flank diameter is specifically adapted in each case to the workpiece alloy used. In addition, it is also possible to regrind the thread teeth of the thread profile as part of a tool post-processing. In this case, the axial offset by which the tool is to be adjusted in the axial direction in the groove forming step at the beginning of the reversing stroke R in order to achieve a corresponding material engagement in the chip-facing thread flanks 19 would increase.

The structure and the mode of operation of a tapping tool according to a further exemplary embodiment are described hereinafter with reference to FIGS. 11 to 15. The tapping tool shown in FIG. 11 basically corresponds to that of the preceding figures. Therefore, reference is made to the previous description. The tapping tool shown in FIG. 11 additionally has a reversing tooth 57, using which the flank allowance $\Delta x$ is removed from the chip-facing thread flank 19 in an operationally-reliable manner in the reversing stroke R described later with reference to FIG. 15.

Figure 12:
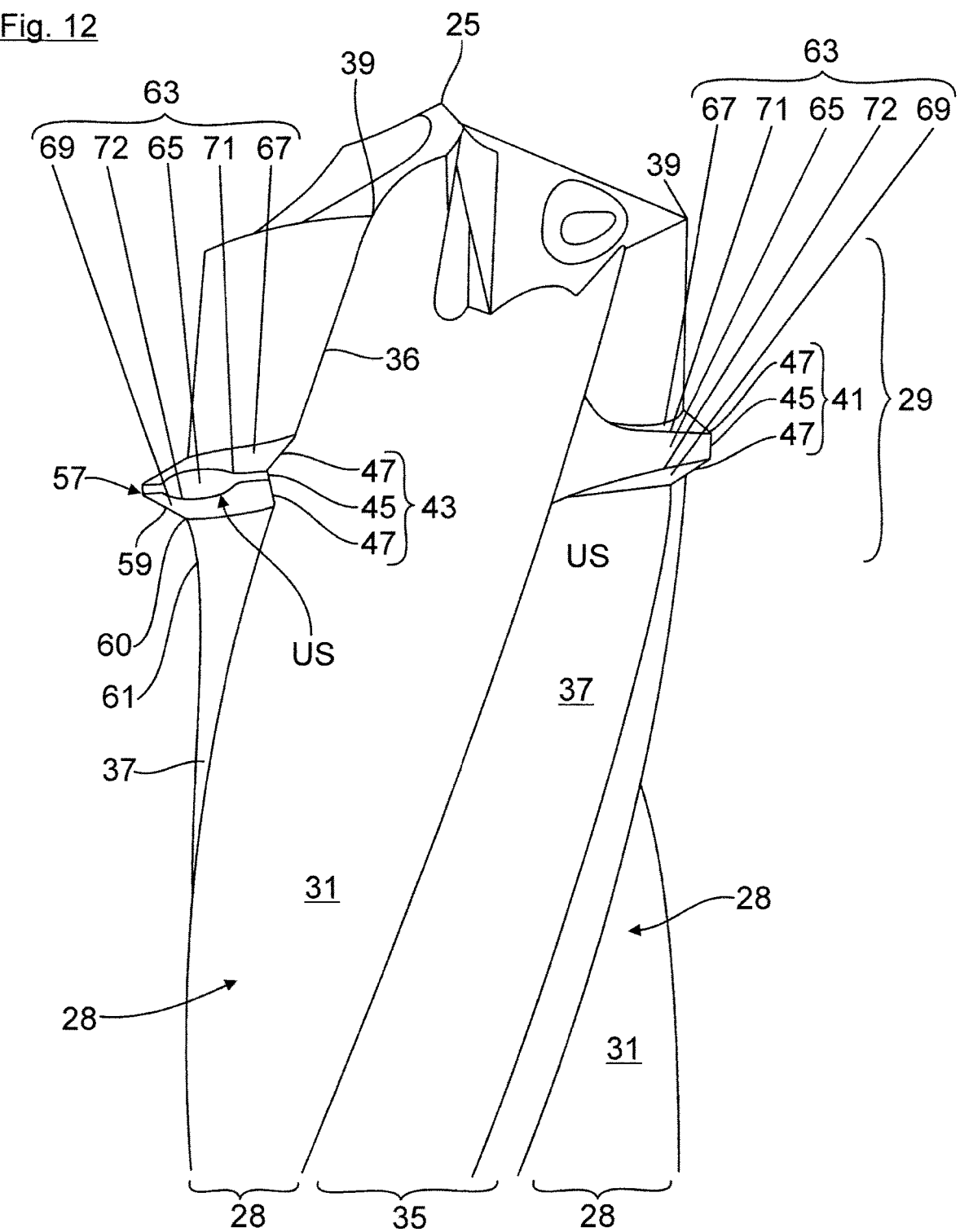
FIG. 12 shows views of a tapping tool according to a further exemplary embodiment.

FIGS. 12 to 14 relate to different side views of the tapping tool. In FIG. 12, the preliminary machining tooth 41, the finishing tooth 43, and the reversing tooth 57 are shown. In FIG. 13, the middle tooth 42 and the finishing tooth 43 are shown, while in FIG. 14, the finishing tooth 43, the reversing tooth 57, and the preliminary machining tooth 41 are shown.

The reversing tooth 57 is shown in FIGS. 12, 14, and 15 designed having a thread flank cutting/forming edge 59. In the reversing stroke R, the tapping tool is controlled in such a way that its thread flank cutting/forming edge 59 removes or forms the flank allowance $\Delta x$ from the chip-facing thread flanks 19 to the finished dimension.

Figure 11:
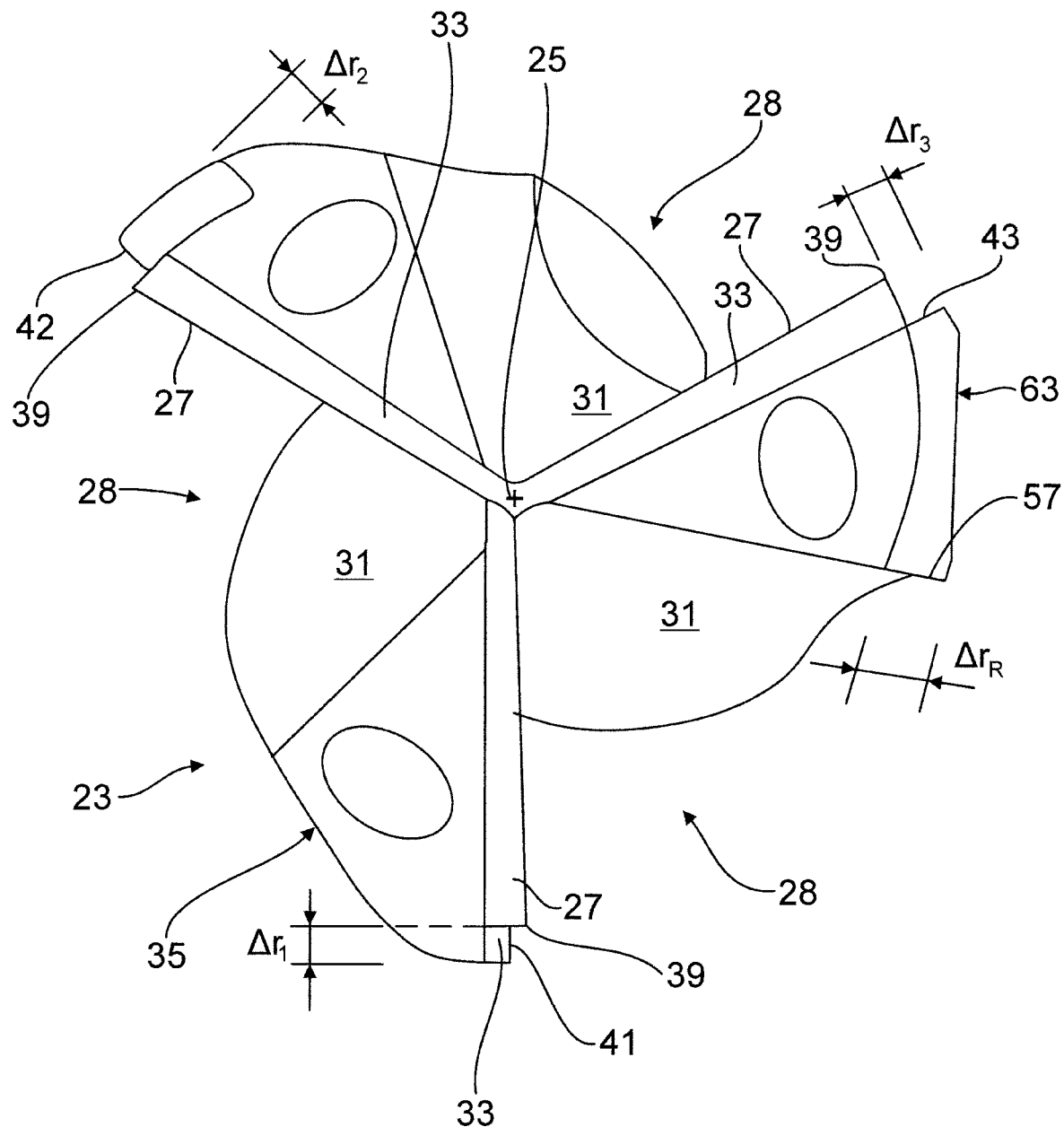
FIG. 11 shows views of a tapping tool according to a further exemplary embodiment.

The reversing tooth 57, like the thread profile teeth 41, 42, 43, is formed on the drill web rear face 37. The reversing tooth 57 protrudes radially outward beyond the main cutting edge 39 by a reversing tooth height $\Delta r_R$ (FIG. 11). The thread flank cutting edge 59 of the reversing tooth 57 merges in FIG. 14 or 15 into a reversing cutting edge 61, which is also active in the reversing stroke H, at a radially inner cutting edge inside corner 60. Therefore, in the reversing stroke R, there is not only machining (for example, cutting machining) of the chip-facing thread flanks 19 of the bore internal thread 9, but rather simultaneously also deburring of the inner thread vertex 21 of the internal thread 9, as indicated in FIG. 15. With this deburring, burr formation on the inner thread vertex 21 is avoided, which would otherwise result during the machining of the chip-facing thread flanks 19.

As can also be seen from FIGS. 12 to 15, the outer circumferential drill web rear face 37 and the rake face 31 of the flute 28 converge at the reversing cutting edge 61. The reversing cutting edge 61 and the secondary cutting edge 36 therefore both extend along the drill longitudinal direction and are formed on drill web longitudinal edges K1, K2 (FIG. 14) which lie opposite in the drill circumferential direction.

In order to form a stable thread profile 29 on the tapping tool, a tooth web 63 adjoins each thread profile tooth 41, 42, 43 and the reversing tooth 57. This is formed in each case on the drill web rear face 37. The respective thread profile tooth 41, 42, 43 and the reversing tooth 57 is thus protected from premature tool breakage in the tapping stroke G and/or in the reversing stroke R. As can be seen from FIG. 14, the thread profile tooth 43 and the reversing tooth 57 are connected to one another via a tooth web 63 formed on the drill web rear face 37. The tooth web 63 has a radially outer web vertex surface 65 and a web flank surface 67 facing toward the drill tip 25 and a web flank surface 69 facing away from the drill tip 25. To reduce the tool load during the tapping stroke G and/or during the reversing stroke R, the above-mentioned web surfaces 65, 67, 69 can be formed at least partially as free surfaces, which are essentially inoperative in the tapping stroke G and/or in the reversing stroke R.

According to FIGS. 12 to 14, the web vertex surface 65 of the tooth web 63 merges at a first circumferential web edge 71 into the web flank surface 67 facing toward the drill tip 25. Moreover, the web vertex surface 65 merges at a second circumferential web edge 72 into the web flank surface 69 facing away from the drill tip 25. With respect to a reduced tool load during the groove forming stroke N, the tapping tool has a circumferential groove cutting edge US (FIGS. 12 to 14) to produce the circumferential groove 13 in the groove forming stroke N. In the embodiment variant shown, the circumferential groove cutting edge US is implemented especially by means of second circumferential web edge 72.

The invention claimed is:

1. A tapping tool for producing a threaded bore having an internal thread in a workpiece, wherein the tapping tool can be driven into the workpiece in a tapping stroke, and the tapping tool can be led out of the threaded bore in a reversing stroke, the tapping tool comprising: a clamping shaft and an adjoining tapping body, along the longitudinal axis of the tapping body at least one flute extends up to a frontal main cutting edge on the drill tip, on which main cutting edge a rake face delimiting the flute and a frontal free surface of the drill tip converge, wherein the flute is delimited by at least one drill web in the circumferential direction of the tool and the rake face of the flute merges into an outer circumferential rear face of the drill web while forming a secondary cutting edge, and wherein the secondary cutting edge and the frontal main cutting edge converge at a radially outer main cutting edge corner, wherein a thread profile having at least one thread profile tooth is formed on the outer circumferential rear face of the drill web, wherein the tool thread profile has at least one reversing tooth having a thread flank cutting/forming edge, by which a flank allowance can be removed and/or formed from a plurality of thread flanks, which face toward the chips to be removed in the tapping stroke, of the internal thread to be produced during the reversing stroke.

2. The tapping tool as claimed in claim 1, wherein in the tapping stroke, the tapping tool can be driven into the workpiece at a tapping feed rate in the tapping direction and at a tapping speed synchronized therewith, and the tool main cutting edge produces a core hole bore and the tool thread profile forms the internal thread on the inner wall of the core hole bore, and/or in the reversing stroke, the tapping tool can be led out of the threaded bore in the reversing direction at opposing reversing feed rate and reversing speed synchronized therewith, so that the tool thread profile can be led in the thread turn of the internal thread out of the threaded bore, and/or chips are produced in the tapping stroke, which are conveyed out of the threaded bore in a chip removal direction opposite to the tapping direction and collide with the thread flanks of the internal thread, which face toward the chips to be removed.

3. The tapping tool as claimed claim 1, wherein the reversing tooth formed on the drill web rear face protrudes radially outward beyond the main cutting edge corner by a reversing tooth height, and/or the thread flank cutting edge of the reversing tooth merges into a reversing cutting edge at a radially inner cutting edge inside corner, and the inner thread vertex is deburred by the reversing cutting edge in the reversing stroke.

4. The tapping tool as claimed in claim 3, wherein the reversing cutting edge extends in the drill longitudinal direction, and/or the outer circumferential drill web rear face and the rake face of the flute converge at the reversing cutting edge, and/or the reversing cutting edge and the secondary cutting edge are formed on drill web longitudinal edges which lie opposite in the drill circumferential direction.

5. The tapping tool as claimed in claim 1, wherein a tooth web formed on the drill web rear face adjoins the at least one thread profile tooth and/or the reversing tooth in the drill circumferential direction, and/or the thread profile teeth and/or the reversing tooth are each formed as a forming tooth having corresponding forming edges and/or as a cutting tooth having corresponding chip-removing cutting edges or as a combination thereof.

6. The tapping tool as claimed in claim 1, wherein the reversing tooth and the thread profile tooth are connected to one another via a tooth web formed on the drill web rear face, and/or the tooth web has end faces facing away from one another in the drill circumferential direction, which respectively form the thread profile tooth and the reversing tooth.

7. Tapping tool as claimed in claim 1, wherein the tooth web has a has a radially outer web vertex surface and a web flank surface facing toward the drill tip and a web flank surface facing away from the drill tip, and/or the web surfaces are at least partially formed as free surfaces, which are inoperative in the tapping stroke and/or in the reversing stroke, and the web vertex surface merges at a first circumferential web edge into the web flank surface facing toward the drill tip, and/or the web vertex surface merges at a second circumferential web edge into the web flank surface facing away from the drill tip, and at least one of the two circumferential web edges is formed as a circumferential groove cutting edge, by which the circumferential groove adjoining the bore internal thread is formed, by cutting, in the groove forming stroke.

8. A method for producing a threaded bore in a workpiece by a tapping tool as claimed in claim 1, comprising
   driving the tapping tool into the workpiece in a tapping stroke, and
   leading the tapping tool out of the threaded bore in a reversing stroke.

9. The method as claimed in claim 8, wherein a groove forming step takes place between the tapping stroke and the reversing stroke, in which the tapping stroke in the tapping direction is lengthened by a groove forming stroke, namely with the formation of a circumferential groove adjoining the internal thread without a thread pitch, in which the thread profile of the internal thread can rotate without load, and/or by providing the circumferential groove, it is also possible for the tapping tool to produce a circumferential thread countersink in the bore opening of the bore using a cutting edge, wherein the circumferential thread countersink is produced during the above groove forming step.

10. A tapping tool for producing a threaded bore having an internal thread in a workpiece, wherein the tapping tool can be driven into the workpiece in a tapping stroke, and the tapping tool can be led out of the threaded bore in a reversing stroke, wherein a groove forming step takes place between the tapping stroke and the reversing stroke, in which the tapping stroke is extended by a groove forming stroke in a tapping direction, the tapping tool comprising: a clamping shaft and an adjoining tapping body, and at least one flute extends along the longitudinal axis of the tapping body up to a frontal main cutting edge on the drill tip, on which main cutting edge a rake face delimiting the flute and a frontal free surface of the drill tip converge, wherein the flute is delimited by at least one drill web in the circumferential direction of the tool and the rake face of the flute merges into an outer circumferential rear face of the drill web while forming a secondary cutting edge, and wherein the secondary cutting edge and the frontal main cutting edge converge at a radially outer main cutting edge corner, wherein a thread profile having at least one thread profile tooth is formed on the outer circumferential rear face of the drill web, wherein the tool thread profile is formed having at least one circumferential groove cutting edge, by which the circumferential groove adjoining the bore internal thread is formed in the groove forming stroke.

* * * * *